L. A. POTHAST.
SIDE CAR ATTACHMENT.
APPLICATION FILED FEB. 21, 1913.
1,080,020.
Patented Dec. 2, 1913.
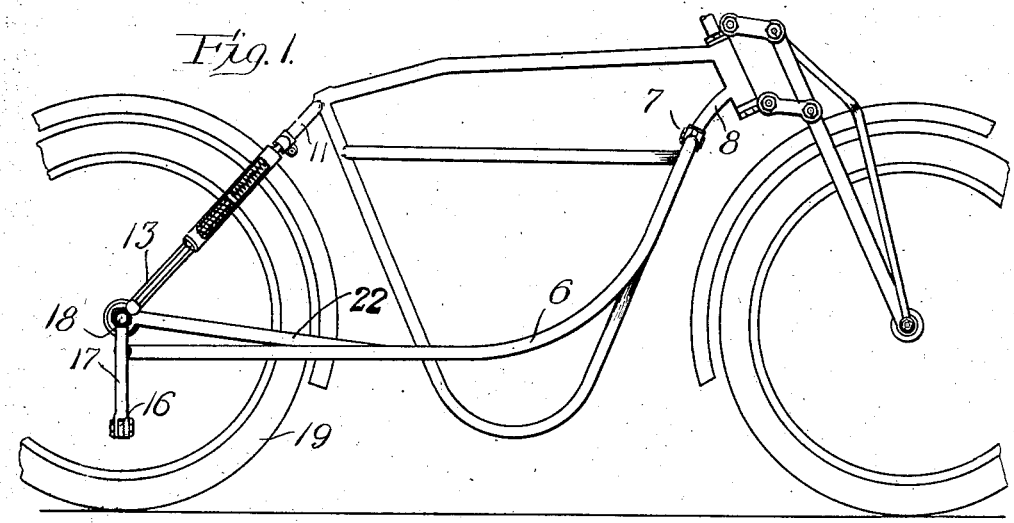
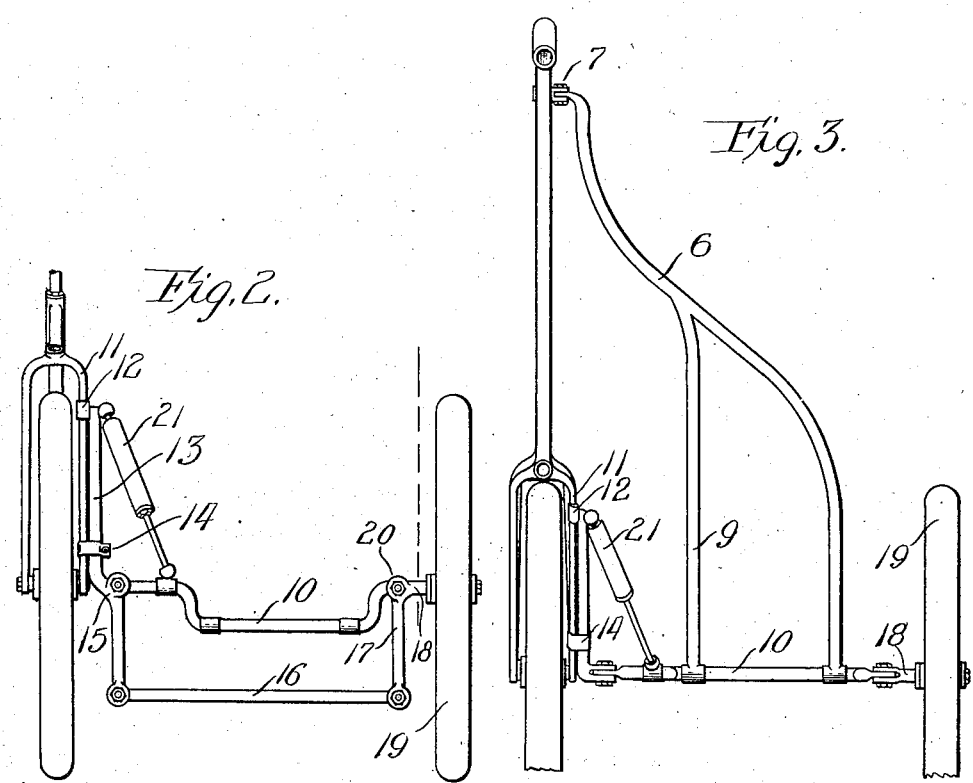

UNITED STATES PATENT OFFICE.

LEO A. POTHAST, OF MELBOURNE, IOWA.

SIDE-CAR ATTACHMENT.

1,080,020.  Specification of Letters Patent.  Patented Dec. 2, 1913.

Application filed February 21, 1913. Serial No. 750,007.

*To all whom it may concern:*

Be it known that I, LEO A. POTHAST, a citizen of the United States, residing at Melbourne, in the county of Marshall and State of Iowa, have invented certain new and useful Improvements in Side-Car Attachments, of which the following is a specification.

This invention relates to side car attachments for vehicles and especially to side car attachments for motor cycles and the like.

An object of the invention is to provide a side car which can be attached to any motor cycle without requiring any reconstruction of the motor cycle and one which can easily be attached by any person.

A still further object of the invention is to provide a means whereby the movement of the motor cycle will be transmitted to the side car in such a manner that when making a turn, the frame of the motor car will not be subjected to any extra strain. Thereby short and rapid turns can be made without danger or inconvenience to the occupant of the side car. To this end, an arrangement has been contrived whereby the wheel of the side car will remain in contact with the road or traveling surface when the motor cycle leans over in making a turn. In this way the frame of the motor cycle is not subjected to the strain of raising the side car attachment when making a turn nor the additional strain when the side car again strikes the ground.

Furthermore, it is an object of the invention to provide a means connected between the side car and the motor cycle whereby the motor cycle may stand erect when not in use.

These and other features, advantages and capabilities of the invention will become more apparent from a detail description of the drawings in which—

Figure 1 is an elevation of a motor cycle with the frame of the side car attached thereto, the wheel and other portions of the side car being broken away. Fig. 2 is an end elevation of the same with the wheel of the side car secured thereto, and Fig. 3 is a top plan view of the side car attached to the motor cycle.

In the drawings is shown a motor cycle to which the frame of a side car is attached. This frame as shown in Fig. 3 is substantially inverted Y-shaped, having a long curved member 6, the forward end of which is pivotally connected to a clamp 7 which is fastened to the forward frame member 8 of the motor cycle, and a shorter straight member 9 extending from approximately the middle of the member 6 rearwardly, the rear portions preferably integral members 6 and 9 running parallel with the motor cycle. The rear ends of these members 6 and 9 are rigidly fixed on the depressed portion of a crank-shaped member 10.

To the rear frame member 11 of the motor cycle at its upper end at 12 is securely fixed the bent bar 13. This bar 13 is again secured at the lower end of the frame member 11 by a clamp 14. Just beyond clamp 14, the bar 13 makes a slight outward bend and at 15 bends vertically downward. At the lower end of this bar 13 is pivotally connected a link member 16 which normally extends parallel with the ground and outwardly from the motor cycle. At the other end of link member 16 it is pivotally connected to a bent member 17. This bent member 17 is substantially right angular, having a downwardly extending portion and an upper horizontal portion 18 which serves at its outer end as an axle for the wheel 19. The crank member 10 is pivotally connected at 15 to the bent member 13 and to the bent member 17 at the angle 20 of said bent member 17.

From the foregoing it will be seen that when the motor cycle bends away from the side-car when turning a corner, the several pivot or hinge points will come into play and allow the wheel 19 to remain on the ground and at the same time make the same angle with the ground that the motor cycle has.

To maintain the motor cycle in upright position when not in use, a compression spring 21 is provided. This spring 21 at its lower end is securely fastened to the crank member 10. At its upper end it is fastened to the upper end of the bent member 13. Thus when the motor cycle is tilted to lean toward the side-car, the compression spring will hold the same erect.

The numeral 22 represents a part of the frame of the motor cycle connecting its rear axle with the main frame.

While I have herein shown and described only one embodiment of my invention, it is to be understood that various changes and modifications may be made by those skilled in the art without departing from the scope of my invention as defined in the appended claims.

Having thus described my invention what I claim as new and desire to secure by Letters Patent is:

1. A side-car attachment for motor cycles, having a frame pivotally connected to said motor cycle, a wheel for said side car, an axle for said wheel pivotally connected to said frame and having a downwardly projecting member, and a link pivotally connected at one end to said motor cycle and at its other end to said downwardly projecting portion.

2. In a side-car attachment for vehicles, whereby said side-car while in operation will remain in contact with the ground whatever the position of the motor cycle to the ground, a frame pivotally connected to said vehicle at its forward end, a member rigidly fixed to the rear of said motor cycle, said frame pivotally connected at its rear end to said rigid member, a wheel for said side-car, an axle for said wheel pivotally connected to said frame and having a downwardly projecting member, and a link pivotally connected at one end to said motor cycle and at its other end to said downwardly projecting portion.

3. A side-car attachment for motor cycles having a frame pivotally connected to said motor cycle, a wheel for said side car, an axle for said wheel pivotally connected to said frame and having a downwardly projecting portion, a link pivotally connected at one end to said motor cycle and at its other end to said downwardly projecting portion, and a compression spring connected between said frame and said motor cycle to hold the motor cycle erect when not in operation.

4. In a side-car attachment for vehicles whereby said side-car while in operation will remain in contact with the ground whatever the angle of the motor cycle to the ground, a frame pivotally connected to said vehicle at its forward end, a member rigidly fixed to the rear of said motor cycle, said frame pivotally connected at its rear end to said rigid member, a wheel for said side-car, an axle for said wheel pivotally connected to said frame and having a downwardly projecting member, a link pivotally connected at one end to said motor cycle and at its other end to said downwardly projecting portion, and a compression spring connected between said frame and said motor cycle to hold the motor cycle erect when not in operation.

5. A side-car attachment for motor cycles having a frame pivotally connected to said motor cycle at its forward end, said frame composed of two bars integral with one another, one curved upwardly at its forward end and the other beginning at substantially the middle of said curved bar extending rearwardly in a straight line, the rearward portions of both bars being parallel, a crank-shaped member to the depressed portion of which both said bars are secured, and an upright bent member rigidly secured to the rear portion of said motor cycle, said crank member being pivotally connected to said upright member, a wheel for said side-car, a bent axle member carrying said wheel and pivotally connected to said crank member, and a link connecting said upright member with said bent axle member.

6. A side-car attachment for motor vehicles having a frame pivotally connected to said motor vehicle at its forward end, said frame terminating in two parallel bars at its rear end, a crank-shaped member to the depressed portion of which both said bars are secured, and an upright bent member rigidly secured to the rear portion of said motor vehicle, said crank member being pivotally connected to said upright member, a wheel for said side-car, a bent axle member carrying said wheel and pivotally connected to said crank member, a link connecting said upright member with said bent axle member, and a compression spring connected between said frame and said motor cycle to hold the motor cycle erect when not in operation.

In witness whereof, I hereunto subscribe my name to this specification in the presence of two witnesses.

LEO A. POTHAST.

Witnesses:
  L. M. HOFFMAN,
  FRED H. POTTER.